F. W. PUTMAN.
EYE TESTING APPARATUS.
APPLICATION FILED MAR. 23, 1916.
1,230,027.
Patented June 12, 1917.
4 SHEETS—SHEET 1.
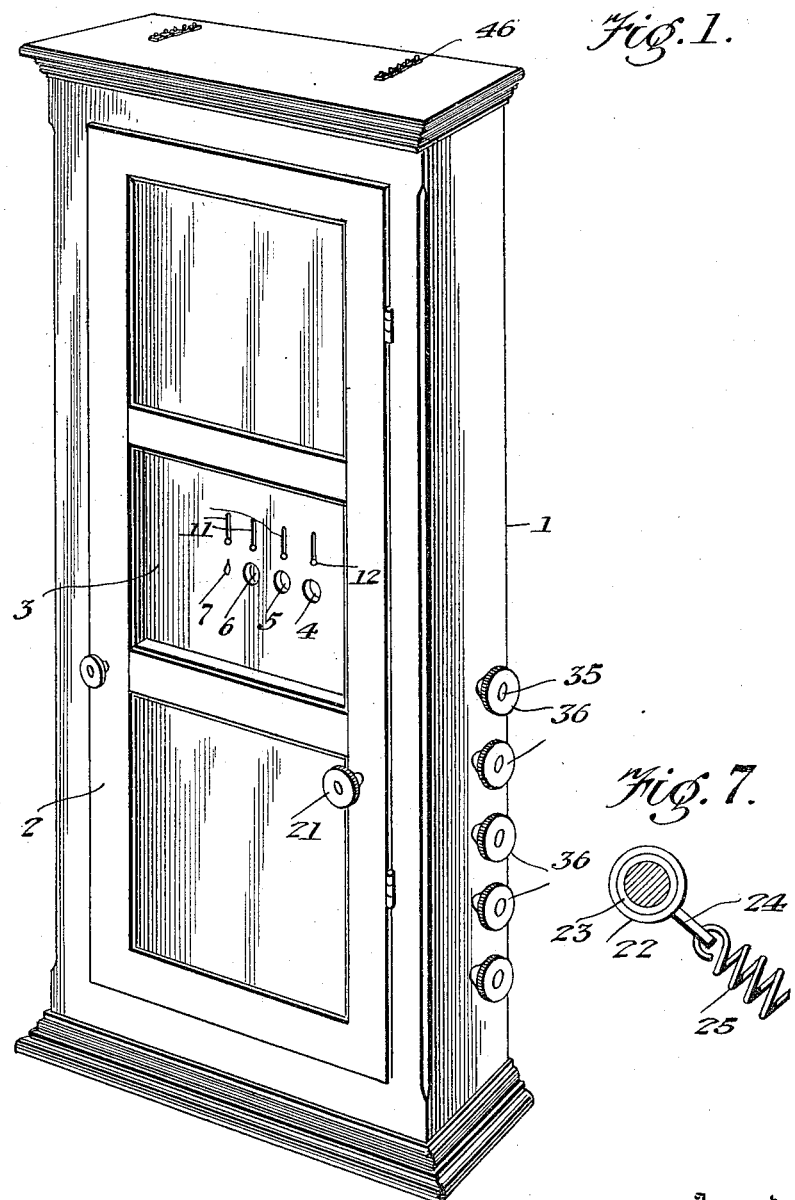

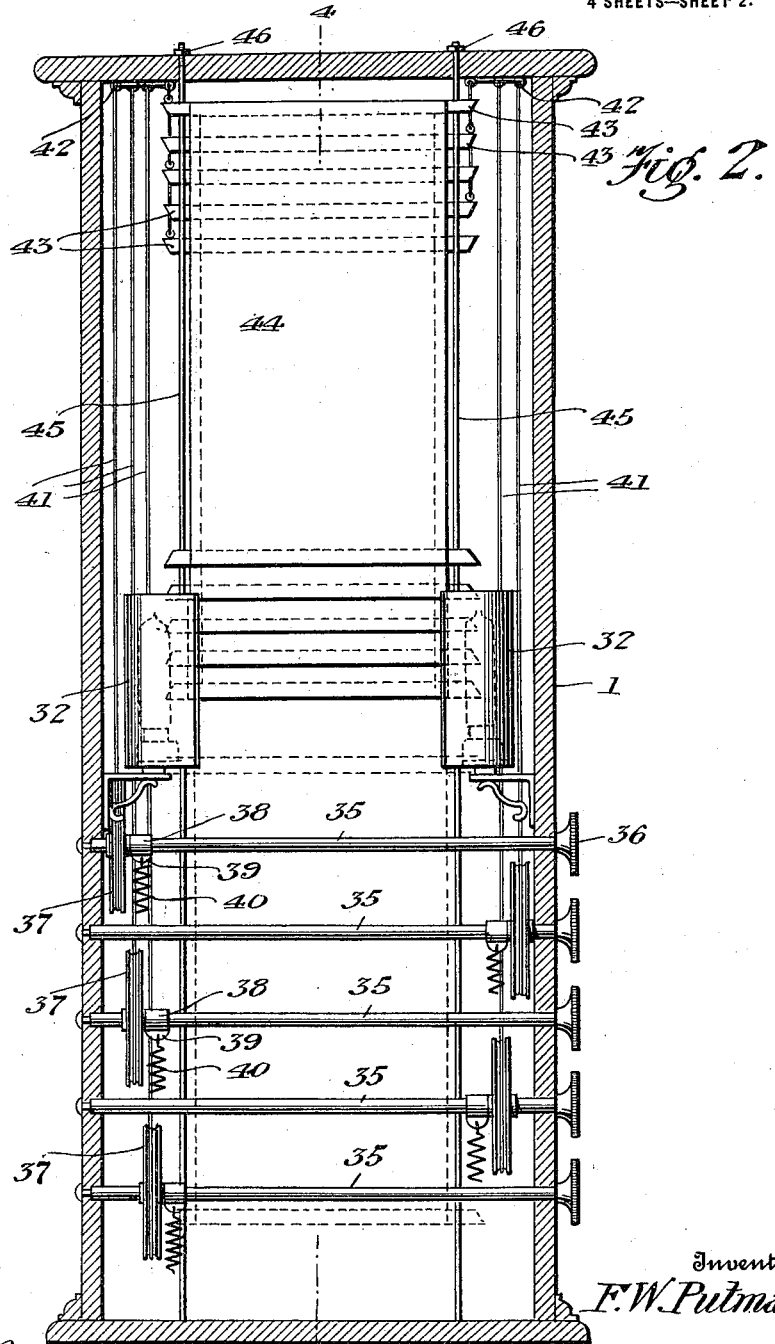

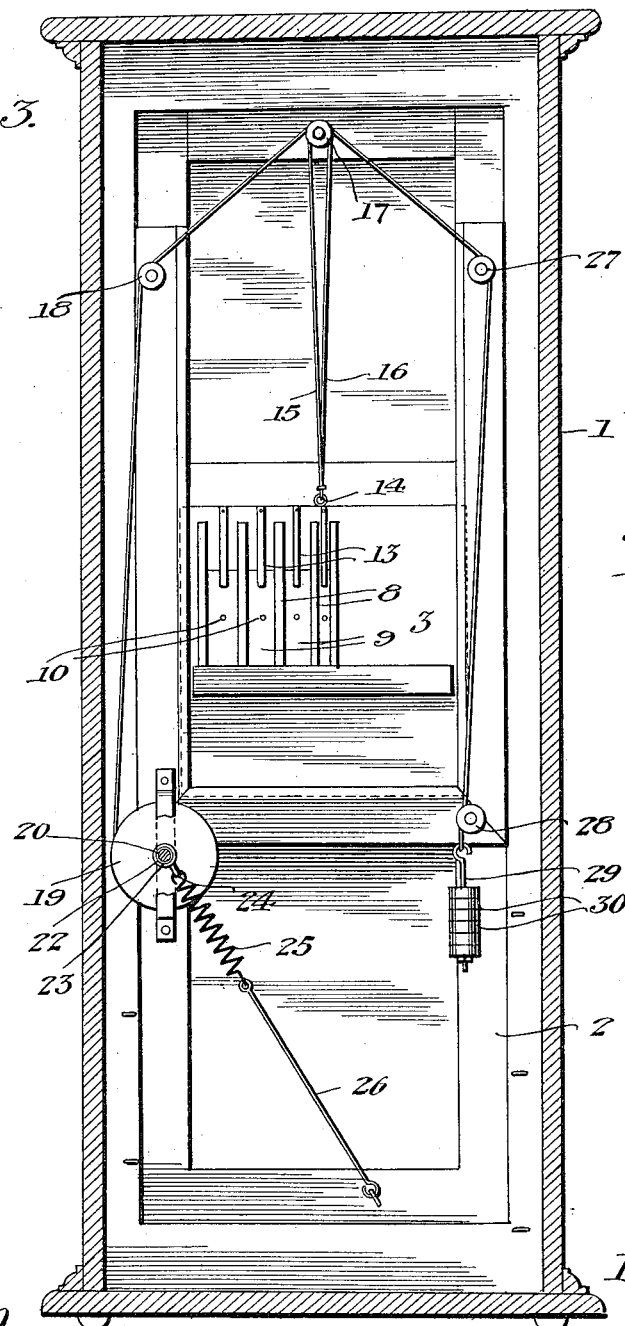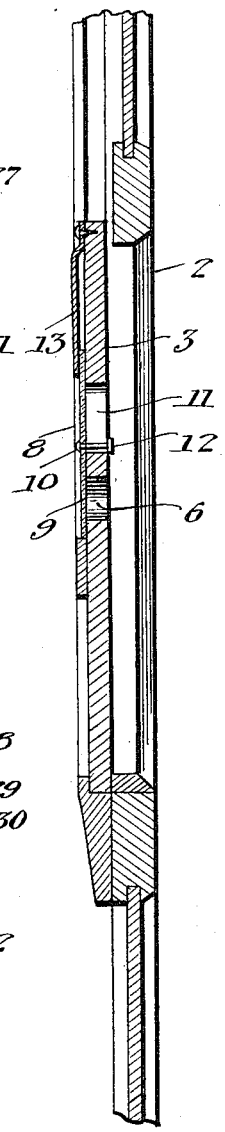

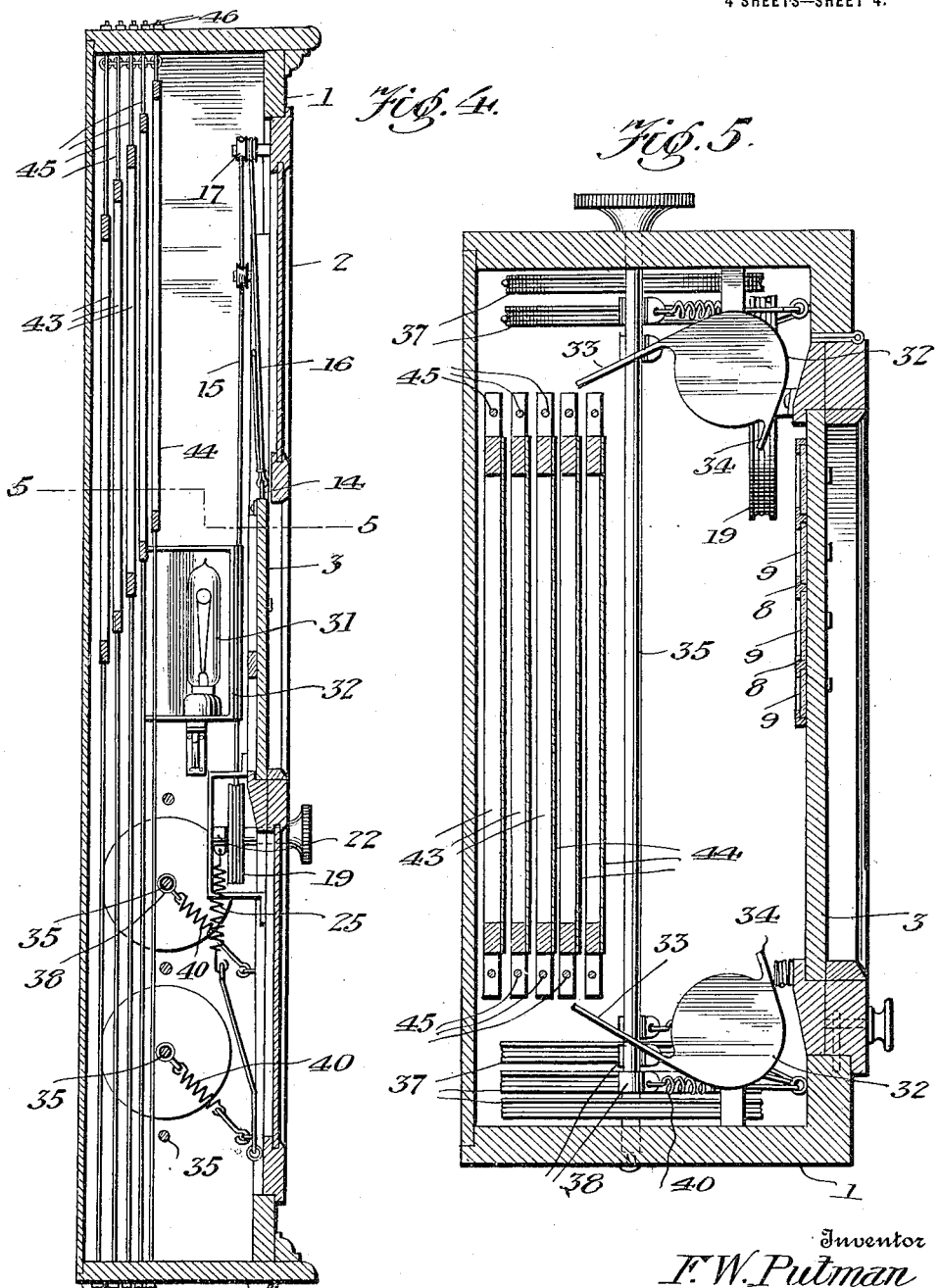

UNITED STATES PATENT OFFICE.

FRANK WELLINGTON PUTMAN, OF NEWPORT, RHODE ISLAND.

EYE-TESTING APPARATUS.

1,230,027.  Specification of Letters Patent.  Patented June 12, 1917.

Application filed March 23, 1916. Serial No. 86,148.

*To all whom it may concern:*

Be it known that I, FRANK WELLINGTON PUTMAN, a citizen of the United States, residing at Newport, in the county of Newport and State of Rhode Island, have invented certain new and useful Improvements in Eye-Testing Apparatus, of which the following is a specification.

The present invention relates to improvements in eye testing apparatus.

An object of the invention is to produce a cabinet for subjective eye testing having lights therein arranged to direct their rays toward one of a plurality of charts and provided with a sliding door having openings therein covered by different colored transparent plates, a shutter being provided for each of the said openings, whereby one or all of the openings may be covered or uncovered, as occasion requires.

A still further object of the invention is to provide an apparatus for subjective eye testing comprising a cabinet having a slidable panel thereon, said panel being provided with a plurality of openings each having a covering plate of a different color, a shutter being provided for each of the openings, and the cabinet having therein a plurality of charts with individual means for actuating the same, whereby any of the said charts may be brought in a line with the panel and to the rear of the openings therein and also whereby the panel may be raised to fully disclose the charts, the said cabinet being further provided with an illuminating means for the charts.

With the above and other objects in view the improvement resides in the construction, combination and arrangement of parts set forth in the following specification and falling within the scope of the appended claims.

In the drawings:

Figure 1 is a perspective view of a subjective eye testing cabinet constructed in accordance with the present invention, Fig. 2 is a vertical longitudinal sectional view through the same, looking toward the rear of the cabinet, Fig. 3 is a similar sectional view but looking toward the front of the cabinet, Fig. 4 is a sectional view approximately on the line 4—4 of Fig. 2, Fig. 5 is a horizontal sectional view approximately on the line 5—5 of Fig. 4, Fig. 6 is an enlarged detail vertical transverse sectional view taken through the central panel of the door, and Fig. 7 is a transverse sectional view through one of the shafts illustrating the brake apparatus.

The improvement is, of course, designed for use by oculists and is intended to assist in determining irregularities or diseases of the eye, whereby the oculist may easily and quickly ascertain the strength of the lens or glasses to be prescribed for the patient.

As illustrated in the accompanying drawings I employ a substantially rectangular cabinet, broadly indicated by the numeral 1, the said cabinet being of any desired size and proportion, and, of course, embodying the desired ornamentality.

The cabinet has its open front closed by a hinged door 2, a latch being provided for retaining the door in its closed position, the door being preferably of the paneled effect, and the central panel 3 thereof is movable vertically in a manner hereinafter to be described and for a purpose which will be evident to those skilled in the art to which the invention appertains. The panel 3 is provided with a plurality of apertures, each being closed by a transparent plate, as for instance, the plate of one of the apertures, indicated by the numeral 4, may be green; the plate for the aperture 5, blue; the plate for the aperture 6, red; and the aperture 7 being in the form of a candle flame and may or may not be provided with the covering plate, and if a plate is employed, the said plate will be of the ordinary nature, white. The panel 3 to the rear of the referred to apertures is provided with vertically disposed angular guideways 8, and the said guideways have arranged therein shutter members 9. Each of the shutters is provided with a small aperture 10 which is adapted to aline with the referred to apertures or openings covered by the plates and each of the said shutters is further provided with an outwardly extending lug which passes through a vertically disposed elongated slot 11 in the panel 3, and each of the studs is provided with a knob 12, whereby any of the said shutters may be moved vertically to bring the apertures 10 into register with the referred to apertures or openings in the panel 3. To hold the shutters in any desired position, I employ flat springs 13 which are secured to the inner face of the shutter and which frictionally contact one with each of the shutters, as clearly disclosed in Fig. 3 of the drawings.

The panel 3 upon its upper edge is provided with an eye 14 to which are connected two cables 15 and 16 respectively. Each of these cables is trained over a pulley 17 that is journaled at the upper portion of the cabinet, one of the cables, 15, being also trained over a pulley 18 disposed to one of the sides of the cabinet and from thence around a pulley or drum 19, and this drum has its shaft 20 journaled in suitable openings in the cabinet and one of its ends provided with an operating handle or knob 21 which is arranged to the exterior of the cabinet upon the outer face thereof. Furthermore, the shaft 20 is surrounded by a friction band 22 having an inner facing of felt or other flexible material 23 and the said band is provided with an angularly disposed extension 24 to which is secured a spring 25, and the said spring is connected by a rod 26 to the casing. The rod may be adjustable to regulate the tension of the spring 25, and the friction band thus provides a brake whereby the shaft may be halted at any desired period in its rotation, and as a consequence the elevation or raising of the panel 3 may be halted at any desired position.

The cable 16 which also passes over the pulley 17 is trained over a second pulley 27, disposed preferably diametrically opposite the pulley 18, and in addition to this may be trained over or wound around a pulley 28, that may be disposed opposite the drum 19, and the end of this cable is provided with a member 29 which receives any desired number of weights 30, the said weights serving as compensating means for insuring the ease of the operation of the panel.

Arranged within the casing, at approximately the central portion thereof or to the opposite sides of the panel 3 are lamps 31, which are received within reflective casings 32. By reference to Figs. 4 and 5 of the drawings it will be noted that the casings 32 are provided with angularly disposed arms or members 33 and 34, whereby the rays of the light will be directed to the rear of the casing, and to the charts arranged at the said rear of the casing, which will presently be described. The lamps 31 may be of any desired form and strength but preferably of the incandescent type.

The cabinet, below the panel 3, is provided with a plurality of transversely arranged shafts, four of which being disclosed in the accompanying drawings. These shafts, indicated by the numeral 35, are journaled in suitable bearing openings in the sides of the cabinet, one of the ends of each of the same projecting through one of the sides of the cabinet and having thereon a knurled knob or turning member 36. Each of the shafts 35 has secured thereto a grooved wheel or drum 37 and each of the shafts is surrounded by a friction band 38, substantially similar to that previously described, the same having an inner facing of felt or other compressible material and being provided with an extension or ear 39 to which is secured a spring 40, and each of the said springs is connected by a rod or similar element to the cabinet and the rods may be adjustable to regulate the tension of the springs. It will thus be noted that the shafts will be held against accidental rotation.

By reference to Fig. 2 of the drawings it will be noted that the grooved wheels or drums 37 are arranged upon the shafts 35 adjacent to the opposite ends of the cabinet so that the said drums are arranged in different planes but are parallel to each other. Wound around each of the drums or grooved wheels 37 or connected thereto in any desired manner are cables 41, each of said cables being trained through suitable pulleys or eyes 42 arranged upon the top of the cabinet, and each of the said pulleys having its end connected with a frame 43. These frames, as will be noted by reference to the drawings, are disposed one directly to the rear of the other, each of the same being preferably of a substantially rectangular formation and each of said frames has removably secured therein a chart 44. The end members of each of the frames are provided with suitable apertures to receive guide rods 45—45, the said rods being disposed vertically of the cabinet and adjustably connected to both the top and the bottom thereof through the medium of nuts 46 which engage with the threaded ends of the said rods, as clearly illustrated in the drawings.

It will be noted that the rays of light from the lamps 31 will, through the medium of the reflector casings 32, be directed to the charts at the rear of the cabinet. It will be also noted that the shutters for the openings in the panel 3 may be adjusted to bring the apertures in the said shutters in a line with any of the said openings, and to a desired position with relation to the said openings, and further that the shutters may be moved to fully unclose or uncover any of the openings, and as the panel 3 is vertically movable the same may be elevated to permit of a full view of any of the charts being disclosed. From the above it will be noted that the plurality of targets expose the light points of different chromatic emission and by the employment of the same I am enabled to determine color blindness in the patient.

The multiple charts are primarily employed to determine the refractive power of the eye, and the acuity of vision, as for the detection of malingers, and for persons who memorize readily and at length the objects that have previously momentarily visualized. It is to be understood that the various charts carry different sized objects of different characters upon which the lights are reflected, and as such objects and characters suspend different angles the acuity of vision can be readily determined.

The sliding panels are for the purpose of exposing to vision certain sizes of readable types and objects at any one time, thereby preventing the patient from being confused by the diverse conglomeration of the letters and objects exposed, while the candle flame when exposed through the sliding panel is designed for the purpose of detecting any inequality of muscular balance of the rotary muscles of the eye balls, thereby giving the necessary information to the examiner to bring about an equitable correction.

From the above description, taken in connection with the accompanying drawings, the simplicity of the device as well as the advantages thereof will, it is thought, be perfectly apparent to those skilled in the art to which such invention appertains without further detailed description.

Having thus described the invention, what is claimed as new is:

1. In an apparatus for the purpose described, a cabinet having an opening, a sliding panel normally closing the opening, means for operating the panel, said panel having openings, different colored transparent plates for each of the openings, a shutter for each of the openings, charts in the cabinet, and means for illuminating the cabinet.

2. In an apparatus for the purpose set forth, a cabinet, illuminating means in the cabinet, charts in the cabinet, a slidable panel for the cabinet having spaced openings arranged in a line with each other, a transparent plate of a different color for each of the openings, and means for closing said openings.

3. In an apparatus for the purpose set forth, a cabinet having lamps therein whose rays are reflected to the rear of the cabinet, charts in the cabinet at the rear thereof, a slidable panel at the front of the cabinet having a plurality of apertures, a plate of different colored transparent material for each of the apertures, a slidable shutter for each of the plates, and each of the said shutters having an aperture adapted to be arranged in a line with each of said openings.

4. In an apparatus of the class described, a cabinet, lamps within the cabinet, reflectors for the lamps directing the rays of light to the rear of the cabinet, a chart upon the rear of the cabinet, the front of the cabinet having an opening, a slidable panel closing the opening, said panel having openings arranged opposite the chart, a transparent plate of different color for each of the openings, a shutter for each of the plates provided with an aperture registering with the opening when the said shutter is in one position, and friction means for sustaining the shutters in any desired position.

5. In an apparatus of the class set forth, a cabinet, vertically movable charts in the cabinet, lamps having reflectors directing the rays of light toward the charts, a slidable panel for the front of the cabinet having spaced openings, a transparent plate of a different color for each of the openings, the said openings being disposed opposite the chart, and means for individually or simultaneously closing any or all of the said openings.

6. In an apparatus for the purpose set forth, a cabinet, a movable panel in the cabinet, said panel having openings, a transparent plate of a different color covering each of the openings, a shutter for each of the plates, means for individually operating each of the shutters, lamps within the cabinet, reflectors for directing the rays of light from the lamps to the rear of the cabinet, and movable charts in the cabinet rearward of the said lamps.

7. In an apparatus for the purpose set forth, a cabinet having a hinged door provided with a movable panel, means for operating the panel to raise or lower the same, means for retaining the panel at any desired elevation, said panel having openings, transparent plates of different colors covering each of the openings, a shutter having a perforation for each of the plates, means for actuating any of the shutters, lamps within the cabinet, reflectors for the lamps for directing the rays of light therefrom to the rear of the cabinet, and vertically movable charts in the cabinet and to the rear of the said lamps.

8. In an apparatus for the purpose set forth, a cabinet having an open front and a hinged door closing the front, said door having a central opening, a panel normally closing the opening, said panel being provided with openings, a transparent plate of a different color for each of the openings, shutter members for each of the plates, guides for each of the shutter members, spring pressed means frictionally engaging each of the shutters to hold the same at a desired position, each of the said shutters having an aperture arranged to aline with each of the openings when the said shutters are in one position, lamps in the cabinet opposite the panel openings of the door, reflectors for the lamps to direct the rays of light to the rear of the cabinet, and vertically movable charts in the cabinet to the rear of the lamps.

9. In an apparatus for the purpose set forth, a cabinet having a hinged door closing the front thereof, said door having an opening, a panel closing the openings, guides for the panel, a revoluble member having means associated therewith and connected with the panel for elevating the panel, means for retaining the panel at a desired elevation, said panel having openings arranged transversely thereof and in a line one with the other, a transparent plate of a different color for each of the openings, a shutter for each of the plates provided with an aperture arranged to aline with the opening, means for individually actuating each of the shutters, spring means for frictionally contacting with each of the shutters, lamps within the casing opposite the opening in the door, reflectors for the lamps directing the rays of light therefrom to the rear of the cabinet, and vertically movable charts in the cabinet to the rear of the lamps.

10. In an apparatus for the purpose set forth, a cabinet having an open front, a hinged door closing the front, said door having an opening, a vertically movable panel normally closing the opening, said panel having openings, a transparent plate of a different color closing each of the openings, a vertically movable shutter for each of the openings, means for operating the shutters, means for actuating the panel to move the same, reflective lights in the cabinet disposed to the sides thereof and opposite the opening in the door, and a chart in the cabinet to the rear of the lights.

11. In an apparatus for the purpose set forth, a cabinet having an opening, a slidable panel for closing the opening, said panel having openings, a transparent plate of a different color covering each of the openings, a shutter for each of the openings, means for operating each of the shutters, lamps in the cabinet, reflectors for the lamps to direct the rays of light to the rear of the cabinet opposite the openings, shafts journaled in bearing openings in the cabinet, a friction brake for each of the shafts, frames, vertically disposed guides for each of the frames, a chart in each of the frames, flexible elements connected with each of the frames, guide pulleys for each of the flexible elements, and said flexible elements being wound around the referred to shafts.

12. In an apparatus for the purpose set forth, a cabinet, said cabinet having an opening, a slidable panel for closing the opening, said panel having spaced openings, a transparent plate of a different color closing each of the openings, flexible elements connected with the panel, a pulley in the cabinet over which said flexible elements are trained, guide pulleys for the flexible elements, a compensating weight connected with the end of the flexible elements, a shaft, a grooved wheel journaled upon the shaft and receiving the end of the other flexible element, a friction band surrounding the shaft, tension means for the friction band, a shutter for each of the referred to openings in the panel, an operating knob for each of the shutters, each of said shutters having an aperture designed to aline one with each of the said openings in the panel, lamps in the cabinet disposed to the sides of the panel, a reflector for each of the lamps directing the rays of light to the rear of the cabinet, and movable charts arranged to the rear of the lamps.

13. In an apparatus for the purpose set forth, a cabinet having an opening therein, a movable panel for normally closing the opening, said panel having openings, a transparent plate of a different color for each of the openings, a shutter for each of the openings, means for operating each of the shutters, means for actuating the panel to move the same vertically, means for retaining the panel at a desired elevation, lamps in the cabinet to the sides of the openings therein, reflectors for the lamps directing the rays of light to the rear of the cabinet, frames to the rear of the lamps, guide rods for the frames, means for regulating the tension of the guide rods, a chart in each of the frames, shafts journaled in bearing openings in the cabinet below the lamps, a grooved wheel upon each of the shafts, a flexible element wound upon each of the grooved wheels, guide pulleys for the flexible elements, said elements having their ends connected with the respective frames, friction bands surrounding each of the shafts, and spring tension members for each of the friction bands.

In testimony whereof I hereto affix my signature in the presence of two witnesses.

FRANK WELLINGTON PUTMAN.

Witnesses:
WM. H. HAMMERT,
ABNER L. SLOCUM.

Copies of this patent may be obtained for five cents each, by addressing the "Commissioner of Patents, Washington, D. C."